Figure 1:
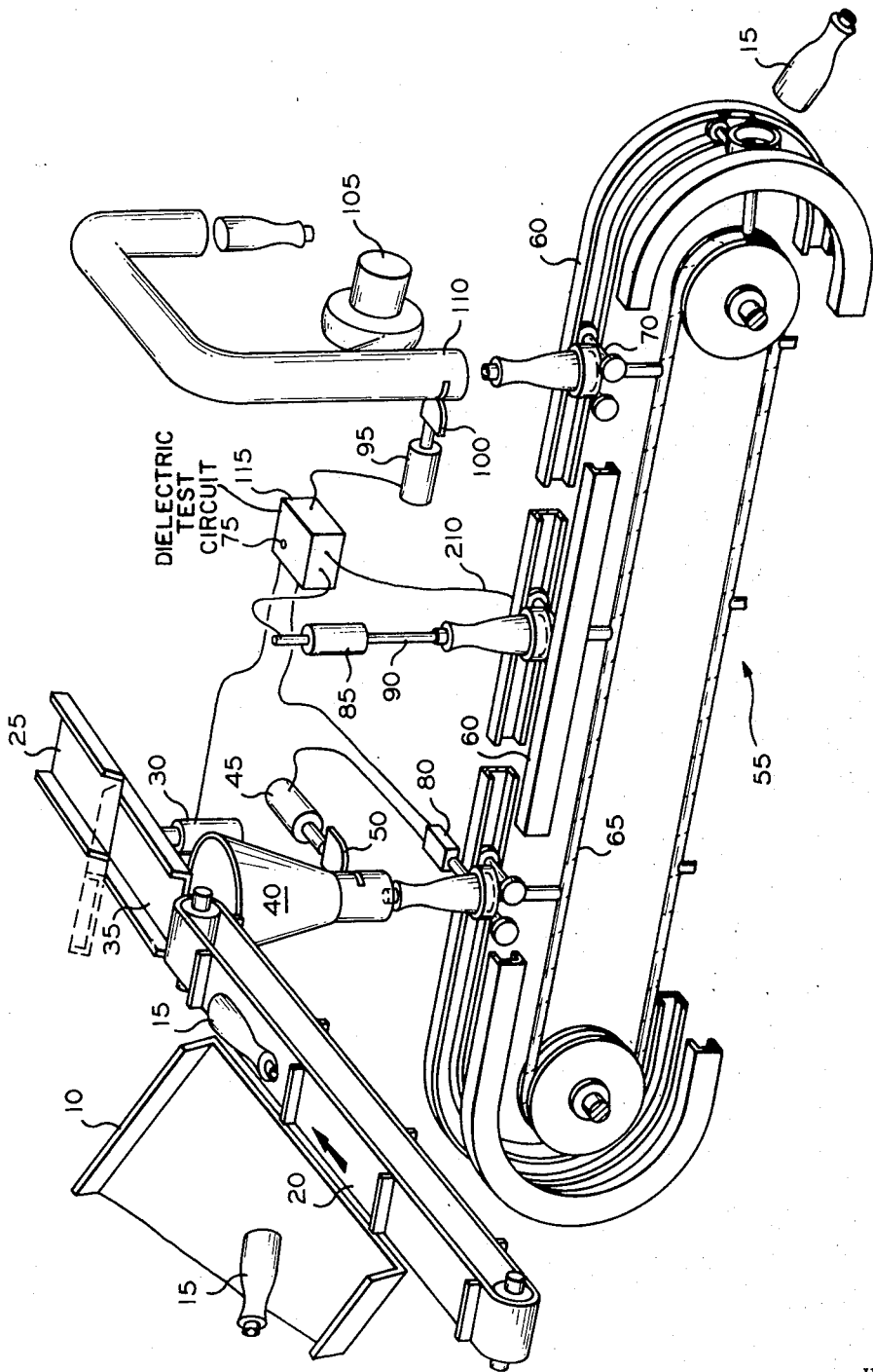

United States Patent

[11] 3,629,699

[72] Inventor Raymond G. Voss
Bartlesville, Okla.
[21] Appl. No. 826,818
[22] Filed May 22, 1969
[45] Patented Dec. 21, 1971
[73] Assignee Phillips Petroleum Company

[54] APPARATUS FOR DIELECTRIC TESTING OF CONTAINERS HAVING AN EXPANDABLE CAPACITIVE ELECTRODE
9 Claims, 6 Drawing Figs.

[52] U.S. Cl. ................................................ 324/61 R,
324/54
[51] Int. Cl. .................................................. G01r 27/26
[50] Field of Search .......................................... 324/61 P,
54, 61; 15/60, 165

[56] References Cited
UNITED STATES PATENTS
3,417,327 12/1968 Breidenbach ................ 324/54

Primary Examiner—Edward E. Kubasiewicz
Attorney—Young and Quigg

ABSTRACT: Apparatus for dielectrically testing the bottom region of a container to determine the existence of pinholes, inhomogeneities, and thin walls which comprises in part an expandable element adapted to be inserted into the neck of a container to be tested and thereafter expanded into testing position wherein one plate of a capacitance element is formed by the expansion of the element into testing position.

INVENTOR.
R. G. VOSS

INVENTOR.
R. G. VOSS
BY Young & Quigg
ATTORNEYS

INVENTOR.
R. G. VOSS
BY Young & Quigg
ATTORNEYS

APPARATUS FOR DIELECTRIC TESTING OF CONTAINERS HAVING AN EXPANDABLE CAPACITIVE ELECTRODE

This invention relates to dielectrically testing the bottom region of a container by the use of an expandable testing element.

Most automated production lines require quality control equipment which accepts or rejects products or goods produced thereon. More specifically, certain quality control equipment is needed to test goods, such as containers, which are shaped or formed into thin membranes which are impervious to the passage of moisture and other agents. Thus, the machines which test these membranes should detect not only the smallest pinholes, but also detect inhomogeneities and thin walls of the membrane which may rupture at a later time.

Although manufacturing defects such as pinholes, variations in wall thickness, and inhomogeneities can be formed in any area of the containers, the vast percentage of them are formed in the bottom region. Manufacturing defects are produced in the bottom region because during the process of manufacture the containers are usually blow molded and the bottom is formed by "stretching" the material "across" the mold rather than "expanding" the material into a cavity. By the "bottom region" it is meant the "bottom" per se and also the region of the container walls that intersects the bottom.

Since these containers are usually made of a dielectric material, a quality control device can conveniently detect defective goods by subjecting them to a high-voltage electric field which causes a spark to pass between plates placed on either side of the dielectric material if the dielectric material is defective. A "sparking" or breakdown of the electric field that indicates a defective membrane is used to actuate a means to remove the defective container from the production line.

Obviously, it is very difficult to perform dielectric testing in the bottom region of a container because of the problem of creating an electric field through the bottom region of a container. When the container is such that the neck is substantially the same size as the bottom, a testing element, which forms one plate of a two-plate dielectric tester, can be inserted through the neck and to the bottom so as to coact with the other dielectric plate and produce an electric field through the bottom region of the container which will break down and spark to indicate a defective container. However, when the neck opening is substantially smaller than the area of the bottom, a severe problem results. If a testing element is small enough to be inserted through the neck, then it is too small to test the entire bottom; and if it is large enough to test the entire bottom region, then it will not fit through the neck.

I have solved the above-noted problem that has hampered container manufacturers for years and have provided a major breakthrough in testing containers, particularly when the neck opening is substantially smaller than the bottom area.

According to this invention, the bottom region of containers is dielectrically tested for manufacturing defects very quickly and inexpensively by inserting an expandable element through the container neck, expanding the element into a testing position after being inserted into the container, and thus forming one plate of a dielectric tester that when positioned in the vicinity of the bottom region of the container will coact with another dielectric plate positioned on the outside of the container and in the vicinity of the container bottom so as to produce an electric field through the bottom region of the container.

Accordingly, an object of this invention is to provide a means of testing the bottom region of a container made of dielectric material.

Another object of my invention is to quickly and inexpensively test the bottom region of a container of dielectric material for manufacturing defects.

Another object of my invention is to quickly and inexpensively test the bottom region of a container of dielectric material for pinholes, inhomogeneities, and thin wall defects.

Another object of my invention is to dielectrically test the bottom region of a container wherein the container neck size is substantially smaller than the area of the container bottom.

Another object of my invention is to provide an expandable element for testing the bottom region of a container that has a neck size substantially smaller than the area of the container bottom.

Other objects, advantages, and features of this invention will be apparent to one skilled in the art from the specification, claims, and drawings.

In FIG. 1 there is indicated an actual commercially practical embodiment of the instant invention being used to test the bottom region of tall elliptical bottom containers that have a neck size substantially smaller than the area of the container bottom.

Figure 2:
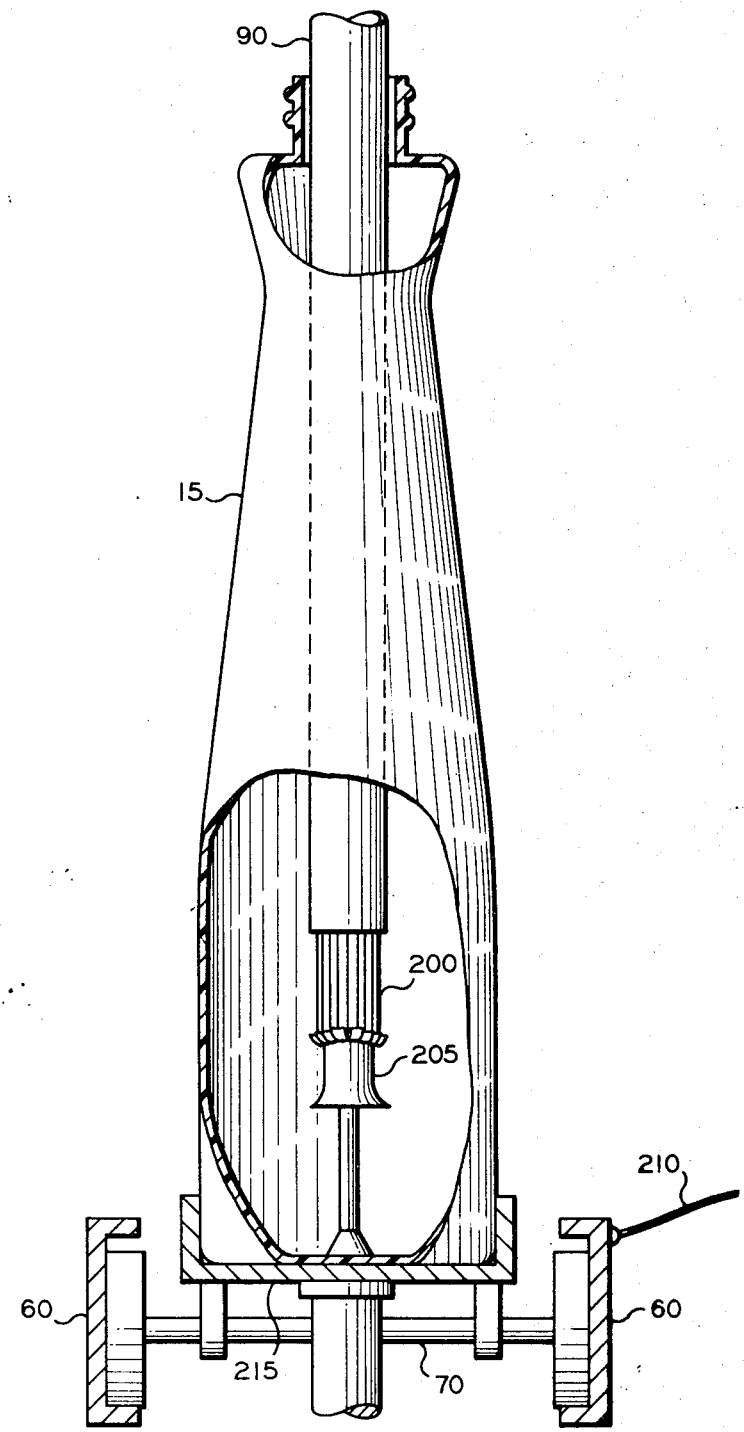

In FIG. 2 there is indicated an elevation view in partial cross section of the embodiment of the invention as shown in FIG. 1 wherein the invention is inserted into a container but has not yet been expanded.

Figure 3:
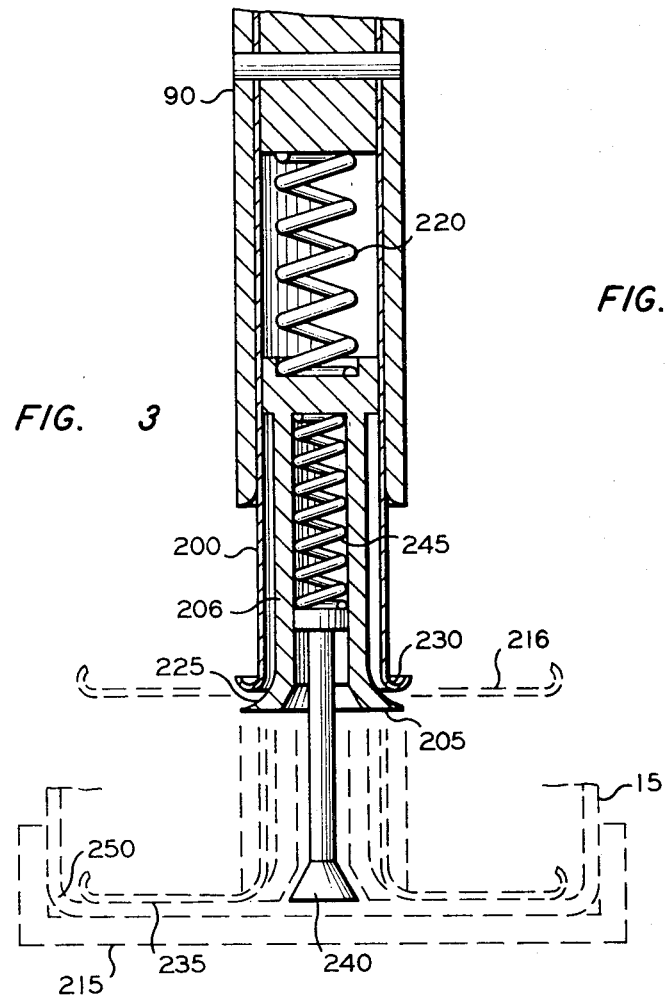

In FIG. 3 there is indicated an elevation view in cross section of the expandable element illustrating the means to expand the expandable element.

Figure 5:
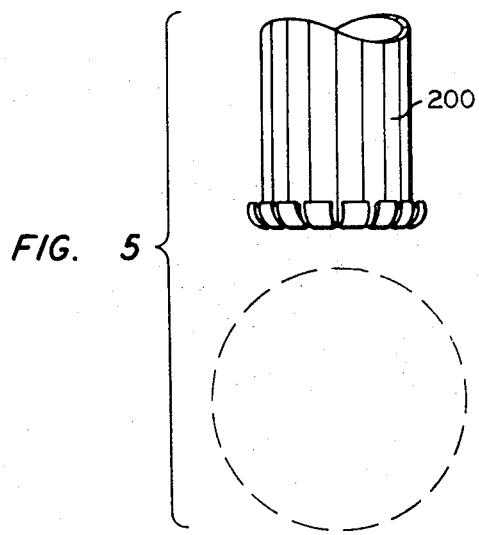
Figure 4:
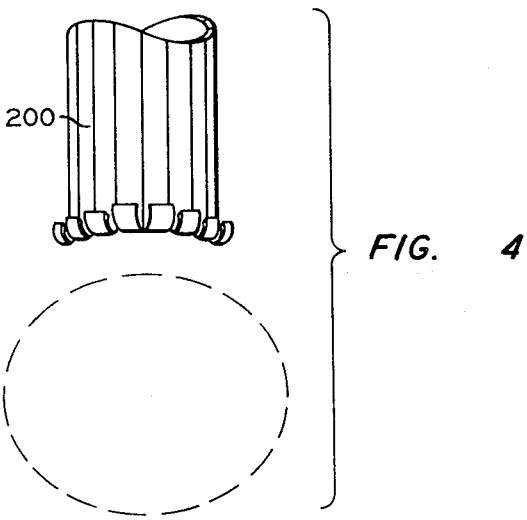
Figure 6:
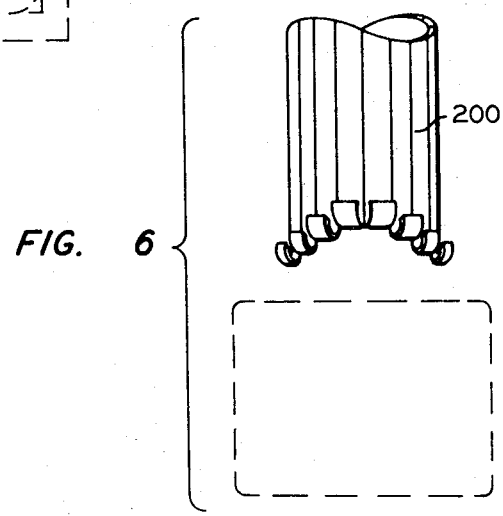

In FIGS. 4, 5, and 6 there are indicated various embodiments of the fingers of the expandable element, each embodiment being adapted to expand, when in a testing position, to a size and configuration substantially similar to the bottom of the particular container being tested.

Referring now to FIG. 1, there is indicated the embodiment of the invention when incorporated into a commercial apparatus adapted for testing bottles being ejected from a manufacturing operation. Thus, in FIG. 1 there is indicated chute 10 conducting containers 15 of dielectric material formed by a manufacturing process onto a conveyor belt 20. Conveyor belt 20 conveys container 15 either down chute 25 to packaging or filling operations or alternatively when air cylinder 30 actuates portion 35 of chute 25 to the upper position, conveyor belt 20 causes container 15 to fall into funnel means 40. Air cylinder 45 is in the forward position and retainer 50 is inserted into funnel 40 so as to support the bottom of container 15 when deposited therein. Conveying mechanism generally designated as 55 comprises rails 60, driving means 65, carriage 70, and suitable means to move driving means 65 forward in incremental positions so as to position a carriage at the bottle container receiving station, at the testing station, and at the discharge station for a specific period of time, say 1 second, and then advance the carriage to the next station.

Thus, according to the operation of the apparatus described, starter button 75 is depressed and air cylinder 30 is actuated so as to cause conveyor 20 to deposit a container in funnel 40. Depending upon the desires of the user, 100 percent of the containers coming off the manufacturing process through chute 10 can be tested or, alternatively, any percentage of the containers can be tested. After air cylinder 30 is actuated by depressing starter button 75 and portion 35 of chute 25 raises, bottle 15 falls into funnel 40 and at this point retainer 50 is inserted into funnel 40 and supports the said container. According to this embodiment of the invention, means 55 is caused to continually and incrementally position carriages in the bottle-receiving position, in the testing position, and in the defective container discharge position continuously. Thus, when carriage 70 strikes tripping mechanism 80 after starter button 75 has been depressed, air cylinder 45 is caused to withdraw supporting means 50 and container 15 then falls onto carriage 70. According to the operation of the invention, means 55 then advances carriage 70 to the testing position. Rails 60 can be constructed of any material that will conduct electricity. Carriage 70 can be constructed of any material that will provide for the conduction of electricity from the rails into said carriage.

While at the testing station, air cylinder 85 is caused to insert the invention, dielectric testing means 90, into container 15 whereupon the container is tested by establishing an electric field between the dielectric plate formed by the carriage and the dielectric plate formed by the expandable element attached to dielectric testing means 90.

After the testing function, air cylinder 85 withdraws means 90 and if sparking occurs, indicating that the container is defective, air cylinder 95 is caused to withdraw restrictor means 100 so as to suck container 15 off the carriage and discharge it to a defective bottle zone by virtue of blower 105 creating a zone of decreased pressure within conduit 110. Means 115 comprises suitable circuitry well known in the art to form an electric device from the expandable element of the dielectric testing means 90 through the bottom region of said container into a carriage 70 which is in turn connected to means 115 by wire 210.

Referring now to FIG. 2, there is indicated, in expanded form, an elevation view in partial cross section, showing rails 60 and carriage 70 transporting elliptically formed bottom container 15. Also illustrated is dielectric testing means 90 positioning expandable element 200 so as to perform dielectric testing. Thus, according to this invention, dielectric testing means 90 inserts expandable element 200 into container 15 in a nontesting position wherein the fingers extend from means 90 as shown in FIG. 2. Expandable element 200 is caused to expand by a means 205 to expand said element in response to said element being placed in a testing position by means 90.

As noted, according to the operation of this invention, rails 60 conduct electric current coming in from means 115 through line 210, through the wheels and axle portion of carriage 70 and into means 215 forming part of carriage 70. Means 215 thus acts as one capacitance plate of a dielectric tester. Means 90 is attached to means 115 and permits current to be conducted to expandable element 200. Thus, when expandable element 200 is expanded by expanding means 205, it expands and forms a second plate of a dielectric testing means and established an electrical field between expandable element 200 and means 215 so as to establish an electrical field through the bottom region of said container and test the container for manufacturing defects by the method as noted earlier. Thus, when means 200 expands it tests not only the bottom per se but also the region of the walls in the vicinity of the intersection of the walls and said bottom.

Referring now to FIG. 3, there is illustrated a cross section view of means 90, expandable element 200, and expansion means 205 which comprises spring 220, plunger 206, spring 245, and plunger foot 240.

In one embodiment where plunger foot 240 and spring 245 are not used, expandable element 200 is caused to expand to testing position in location 235 by the action of plunger 206 moving into the cavity in means 90 and depressing spring 220 when means 90 causes plunger 206 to strike the bottom of container 15. Thus, since expandable element 200 is nonslidably affixed to means 90, when plunger 206 moves into the cavity in means 90 the curved portion of 206, designated as 225, strikes the curved portion of expandable element 200, designated as 230, and causes element 200 to expand to a testing position in location 235.

In the second embodiment of the invention, where plunger 206 causes expandable element 200 to expand to testing position in location 216 before being lowered into the vicinity of the bottom region of said container, designated as location 235, means 205 further comprises plunger foot 240 attached to the end region of plunger 206 and adapted to expand said expandable element in response to said plunger foot 240 striking the bottom of said container when means 90 moves toward the bottom of container 15. Thus, after means 200 is expanded into testing position at location 216, the expanded element is caused to move to the vicinity of the container bottom designated 235. According to this embodiment of the invention, when means 90 moves expandable element 200 toward the bottom of container 15, plunger foot 240 initially makes contact with the bottom of container 15. As means 90 continues to advance toward the bottom of container 15, initially spring 220 is compressed thus permitting plunger 206 to move into the cavity in means 90. As means 90 continues to advance, expandable element 200 is then expanded into testing position in location 216 as spring 220 preferentially compresses and means 90 moves "down" over plunger 206 as plunger 206 remains in the position as shown by the solid lines in FIG. 3. Subsequently, when spring 220 fully compresses then spring 245 will compress and permit means 90 to move expanded element 200 from location 216 to a position in the vicinity of the bottom of the container, depicted as 235. Springs 220 and 245 can either be physically attached to their respective elements or suitable slide retainers can be positioned so as to retain plunger 206 within the cavity in means 90 or retain plunger foot 240 within the cavity in plunger 206.

As has been noted, it is fully within the scope of the invention in one embodiment to expand element 200 to testing position while in the location designated as 235, or in a second and preferred embodiment, the element is expanded in location 216 before being lowered into the vicinity of the bottom of container 15, designated as 235. The second embodiment is preferred because sometimes the fingers of expandable element 220 become damaged as they slide across the bottom of container 15 if they are caused to expand in the location designated as 235.

As noted earlier, the device tests the "bottom region" of container 15. Thus, not only will a manufacturing defect be located in that portion of the bottom region directly between means 215 and means 200 as shown in FIG. 3, but other portions of container 15, such as generally designated 250, will also be subjected to dielectric testing. The testing of this portion of the bottle is extremely important since many manufacturing defects occur in the region where the wall of a container intersects the bottom.

According to this invention, a container may be tested wherein the neck opening is substantially the same size as the area of the bottom; however, this invention is particularly adapted for testing containers wherein the neck opening is substantially smaller than the area of the bottom of the container. In addition, containers of various bottom shapes may be tested as it is fully within the scope of the invention to adapt the fingers of element 200 to expand to a size and configuration substantially similar to the bottom of any container to be tested when the means is expanded into testing position. As noted in FIGS. 1 and 2, in one embodiment this invention can be used to test the bottom region of a relatively tall container wherein the container is equipped with an elliptical bottom and a neck size substantially smaller than the area of the bottom. The fingers of FIG. 4 are specifically adapted to function in this embodiment of the invention. In FIG. 5 there are indicated the fingers of element 200 adapted to expand to a circular bottom configuration, and in FIG. 6 there are indicated the fingers of element 200 adapted to expand to a rectangular cross section.

Thus, this invention is broadly applicable to testing the bottom region of a container of dielectric material by use of an expandable element to create an electric field.

As noted above, the drawing is merely diagrammatic and is not intended to fully show all components of the apparatus which one skilled in the art would routinely design for operation thereof. Obviously, various modifications of this invention can be made in view of the foregoing disclosure and appended claims without departing from the spirit or scope thereof.

I claim:

1. Apparatus for dielectrically testing the bottom region of a container of dielectric material comprising in combination:
   a. an elongated positioning means adapted to be inserted into a container to be tested;
   b. an expandable element connected to said positioning means for electrical conduction and adapted to expand from a nontesting position to a testing position to perform dielectric testing of the bottom region of said container when acting in cooperation with a means to form an electrical field from the expandable element to a capacitance plate; and
   c. means to expand said element in response to said element being placed in testing position by said positioning means;
   d. wherein said elongated positioning means comprises a rod of less size than the container opening;

e. wherein said expandable element is attached to the end of said rod and is of less size than said container opening when in nontesting position and is of substantially the same size as the bottom of said container when expanded to testing position; and
f. wherein said means to expand said element further comprises a plunger attached to the end region of said rod and adapted to expand said element upon response to said plunger striking the bottom of said container when said rod positions said expandable element in the vicinity of the bottom of the container to be tested.

2. The apparatus of claim 1
a. wherein the end region of said rod contains an elongated cavity with an axis of elongation substantially coaxial with the axis of the rod;
b. wherein said expandable element comprises relatively thin fingers of electrically conductive material disposed peripherally around the interior of said elongated cavity and extending outward from said cavity; and
c. wherein said means to expand said element further comprises:
  1. a first spring positioned within said cavity between said plunger and said cavity bottom; and
  2. said plunger slidably mounted within the expandable element and adapted to expand said element when moved from a position beyond the end of said expandable element to a position within said cavity, said movement resulting from the plunger striking the bottom of said container as the rod moves toward the vicinity of the bottom of said container.

3. The apparatus of claim 2
a. wherein said plunger contains an elongated cavity with the axis of elongation substantially coaxial with said first plunger;
b. wherein said means to expand said element further comprises:
  1. a plunger foot slidably mounted within said elongated plunger cavity and extending outward from said plunger when in a nontesting position; and
  2. a second spring of greater compressive strength than said first spring, said second spring residing between the bottom of said plunger cavity and said plunger foot and adapted to force said first spring of lesser compressive strength to allow said plunger to retract into said rod cavity and expand said expandable element as said rod causes the plunger foot to strike the bottom of the container, said second spring also being adapted to allow said plunger foot to retract after the said element has been expanded and thus move said expanded element into the vicinity of the bottom of the container.

4. The apparatus of claim 3
a. wherein said rod cavity is substantially cylindrical and substantially coaxial with said rod;
b. wherein said plurality of flexible fingers attached around the periphery of said rod cavity are adapted to expand to a size and configuration substantially similar to the bottom of said container when in testing position; and
c. wherein said plunger cavity is substantially cylindrical and substantially coaxial with said plunger, said plunger has an end of greater cross section than said fingers in the region adjacent to said rod when in nontesting position, said plunger end adapted to cause said fingers to expand to testing position when said plunger slides into said rod cavity.

5. The apparatus of claim 4
a. wherein said container bottom is circular; and
b. wherein said flexible fingers are constructed to expand to a cross section of circular configuration of substantially the same size as said container bottom.

6. The apparatus of claim 4
a. wherein said container bottom is elliptical; and
b. wherein said flexible fingers are constructed to expand to a cross section of elliptical configuration of substantially the same size as said container bottom.

7. The apparatus of claim 4
a. wherein said container bottom is rectangular; and
b. wherein said flexible fingers are constructed to expand to a cross section of rectangular configuration of substantially the same size as said container bottom.

8. The apparatus of claim 1 further comprising:
a. means to form an electrical field from the expandable element of said dielectric testing means, through the bottom region of said container, and to a means to form an electric field in cooperation with said expandable element;
b. means to position the bottom region of said container adjacent to said means to form an electric field in cooperation with said expandable element; and
c. means to move said positioning means into a container to be tested.

9. The apparatus of claim 8 for testing the bottom region of a container with a bottom of substantially larger area than the cross section of the container opening:
a. wherein said means to form an electrical field from the expandable element comprises:
  1. a plate of electrically conductive material; and
  2. a source of electrical potential connected between said plate and said expandable element so as to form an electrical field through the bottom region of said container when said expandable element is expanded to testing position and placed in the vicinity of the bottom region of said container;
b. wherein said means to position the bottom region of said container adjacent to said means to form an electric field comprises a wall of substantially the same size and configuration as the container bottom, said wall adapted to retain said container in a position where the bottom of said container is adjacent to said plate; and
c. wherein said means to move said positioning means comprises a means to insert said positioning means through said container opening and into the vicinity of the bottom region of said container.

* * * * *